United States Patent
Frank et al.

(10) Patent No.: US 11,959,461 B2
(45) Date of Patent: Apr. 16, 2024

(54) METHOD FOR CONTROLLING A WIND FARM UNDER TURBULENT WIND CONDITIONS

(71) Applicant: VESTAS WIND SYSTEMS A/S, Aarhus (DK)

(72) Inventors: Marco Frank, Norderstedt (DE); Michael Franz, Arbesthal (AT); Gernot Schelch, Vienna (AT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 96 days.

(21) Appl. No.: 17/618,316

(22) PCT Filed: May 29, 2020

(86) PCT No.: PCT/DK2020/050156
§ 371 (c)(1),
(2) Date: Dec. 10, 2021

(87) PCT Pub. No.: WO2020/249173
PCT Pub. Date: Dec. 17, 2020

(65) Prior Publication Data
US 2022/0307475 A1    Sep. 29, 2022

(30) Foreign Application Priority Data
Jun. 14, 2019 (DK) .......................... PA 2019 70374

(51) Int. Cl.
*F03D 7/04* (2006.01)
(52) U.S. Cl.
CPC .......... *F03D 7/048* (2013.01); *F05B 2270/32* (2013.01); *F05B 2270/321* (2013.01)
(58) Field of Classification Search
CPC .................. F03D 7/048; F05B 2270/32; F05B 2270/321; Y02E 10/72
See application file for complete search history.

(56) References Cited

U.S. PATENT DOCUMENTS

| | | | |
|---|---|---|---|
| 2004/0258521 A1 | 12/2004 | Wobben | |
| 2012/0133138 A1* | 5/2012 | Sorensen | ................ F03D 7/028 290/44 |

(Continued)

FOREIGN PATENT DOCUMENTS

| | | |
|---|---|---|
| CN | 101413483 A | 4/2009 |
| CN | 103080540 A | 5/2013 |

(Continued)

OTHER PUBLICATIONS

Danish Patent and Trademark Office, 1st technical Examination of the Patent Application including The Search Report and Search Opinion for Application PA 2019 70374 dated Jan. 29, 2020.

(Continued)

*Primary Examiner* — Elton K Wong
(74) *Attorney, Agent, or Firm* — Patterson + Sheridan, LLP

(57) ABSTRACT

A method for controlling wind turbines of a wind farm is disclosed. The wind farm is positioned at a site which includes one or more turbulence generating structures, such as hills, valleys, trees or buildings. A wind direction at the site of the wind farm is detected, and one or more upstream wind turbines and one or more downstream wind turbines are identified, based on the detected wind direction, where each of the upstream wind turbines is arranged in front of one or more of the downstream wind turbines, as seen in the wind direction. If it is detected that turbulent wind conditions are occurring, based on measurements performed by the wind turbines of the wind farm, then at least one of the upstream wind turbines is controlled based on measurements performed by at least one wind turbine which is a downstream wind turbine relative to the upstream wind turbine.

19 Claims, 6 Drawing Sheets

(56) References Cited

U.S. PATENT DOCUMENTS

| | | | |
|---|---|---|---|
| 2014/0110941 A1* | 4/2014 | Kjaer | F03D 7/048 290/44 |
| 2014/0117668 A1 | 5/2014 | Jayant et al. | |
| 2015/0308416 A1 | 10/2015 | Ambekar et al. | |
| 2018/0238303 A1 | 8/2018 | De Boer et al. | |
| 2019/0072082 A1* | 3/2019 | Lysgaard | G01M 11/081 |
| 2022/0307476 A1* | 9/2022 | Messing | F03D 7/048 |

FOREIGN PATENT DOCUMENTS

| | | |
|---|---|---|
| EP | 2940296 A1 | 11/2015 |
| EP | 3263889 A1 | 1/2018 |
| WO | 2017107919 A1 | 6/2017 |
| WO | 2018116218 A1 | 6/2018 |
| WO | 2020249173 A1 | 12/2020 |

OTHER PUBLICATIONS

S. Cacciola, M. Bertele, J. Schreiber and C.L. Bottasso, "Wake center position tracking using downstream wind turbine hub loads," The Science of Making Torque from Wind, Journal of Physics: Conference Series 753, dated 2016, pp. 1-8.

PCT, Notification of Transmittal of The International Search Report and The Written Opinion of The International Searching Authority, or The Declaration for Application PCT/DK2020/050156, dated Aug. 4, 2020.

European Patent Office, Communication pursuant to Article 94(3) EPC for Application 20 730 570.7-1002 dated 24.11.2023.

Chinese Patent Office, Examination Report for Chinese Patent Application No. 202080043664.X, dated Jan. 6, 2024.

* cited by examiner

METHOD FOR CONTROLLING A WIND FARM UNDER TURBULENT WIND CONDITIONS

FIELD OF THE INVENTION

The present invention relates to a method for controlling wind turbines of a wind farm comprising a plurality of wind turbines under turbulent wind conditions. The method of the invention ensures that the most vulnerable wind turbines of the wind farm are protected.

BACKGROUND OF THE INVENTION

In a wind farm, a plurality of wind turbines is positioned within a specified geographical area. Accordingly, at any given wind direction, some of the wind turbines will be arranged in front of some of the other wind turbines, as seen in the direction of the incoming wind. The wind turbines arranged in front may be referred to as 'upstream wind turbines', while the wind turbines arranged behind at least one other wind turbine may be referred to as 'downstream wind turbines' with respect to the wind turbines arranged in front thereof.

Since the wind turbines are arranged in this manner, variations in the wind pattern will not reach the wind turbines simultaneously. Normally, a variation in the wind pattern will reach the upstream wind turbines before it reaches the downstream wind turbines. Therefore, if variations in the wind pattern are detected at one or more upstream wind turbines, it is possible to take measures at the downstream wind turbines before the variations in the wind pattern reach the downstream wind turbines.

Thus, US 2004/0258521 A1 discloses an early-warning system for wind power installations, in which information is transmitted between individual wind power installations regarding environmental conditions. Wind conditions are measured at an individual wind power installation by means of anemometers or other sensors, and the measurement results are also used for other wind power installations which in the direction of the wind are arranged behind the first wind power installation. If necessary, for example when a gust or squall occurs, the other wind power installations can implement a change in their blade setting angle at a moment which is still in good time before the gust or squall hits the other wind power installations, and then, when the gust or squall hits the other wind power installations, the loading on them is not so great that it can still give rise to damage.

At some wind farm sites the properties of the site are of such a nature that turbulence is introduced. This could, e.g., be due to the terrain of the site, e.g. in the form of hills and/or valleys, and/or it could be due to objects positioned at the site, such as buildings, vegetation, etc. In this case it might not be appropriate to apply measurements from an upstream wind turbine for controlling a downstream wind turbine, i.e. the method described in US 2004/0258521 A1 might be inappropriate.

DESCRIPTION OF THE INVENTION

It is an object of embodiments of the invention to provide a method for controlling wind turbines of a wind farm including one or more turbulence generating structures, in which protection of the most vulnerable wind turbines is ensured.

The invention provides a method for controlling wind turbines of a wind farm comprising a plurality of wind turbines, the wind farm being positioned at a site which includes one or more turbulence generating structures, the method comprising the steps of:

detecting a wind direction at the site of the wind farm, identifying one or more upstream wind turbines and one or more downstream wind turbines, based on the detected wind direction, where each of the upstream wind turbines is arranged in front of one or more of the downstream wind turbines, as seen in the wind direction, detecting that turbulent wind conditions are occurring, based on measurements performed by the wind turbines of the wind farm, and controlling at least one of the upstream wind turbines based on measurements performed by at least one wind turbine which is a downstream wind turbine relative to the upstream wind turbine.

Thus, the invention provides a method for controlling wind turbines of a wind farm. In the present context the term 'wind farm' should be interpreted to mean a plurality of wind turbines arranged within a limited geographical area, and which at least partly share infrastructure, such as substations, power grid connection, etc.

The wind farm is position at a site which includes one or more turbulence generating structures. In the present context the term 'turbulence generating structure' should be interpreted to mean a structure which generates turbulence as wind passes across the structure. Thus, wind turbines positioned behind, or downstream relative to, a turbulence generating structure, as seen in the direction of the incoming wind, will experience turbulence which is introduced by the turbulence generating structure, whereas wind turbines positioned in front of, or upstream relative to, the turbulence generating structure will not experience such turbulence. The turbulence generating structure could be a part of the terrain, such as a hill or a valley, vegetation, such as trees or the like, manmade structures, such as buildings, etc., as long as it has a size and a shape which results in turbulence being generated when the wind passes across the structure.

In the method according to the invention, a wind direction at the site of the wind farm is initially detected. This may be done by means of wind direction sensors mounted on one or more wind turbines of the wind farm, and/or on metmasts or the like arranged at the site of the wind farm or in the vicinity thereof.

Next, one or more upstream wind turbines and one or more downstream wind turbines are defined, based on the detected wind direction. In the present context the term 'upstream wind turbine' should be interpreted to mean a wind turbine which is arranged in front of at least one other wind turbine, as seen in the direction of the incoming wind. Similarly, in the present context the term 'downstream wind turbine' should be interpreted to mean a wind turbine which is arranged behind at least one other wind turbine, as seen in the direction of the incoming wind. Thus, whether a given wind turbine is denoted an upstream wind turbine or a downstream wind turbine with respect to one or more other wind turbines depends on the wind direction. It should further be noted that a given wind turbine may be an upstream wind turbine relative to one or more wind turbines and simultaneously be a downstream wind turbine relative to one or more other wind turbines.

Next, it is determined that turbulent wind conditions are occurring. This is done on the basis of measurements performed by the wind turbines of the wind farm, i.e. based on measurements actually performed at a number of positions within the site of the wind farm, and based on conditions detected by the wind turbines themselves. The measurements could, e.g., be performed using suitable sensors which are used for measuring relevant parameters used for controlling the wind turbines during normal operation. This will be described in further detail below.

Detecting that turbulent wind conditions are occurring at the site of the wind farm is an indication that measures might be required for protecting one or more of the wind turbines of the wind farm against undesired loads caused by the turbulent wind conditions. Thus, in response to determining that turbulent wind conditions are occurring, at least one of the upstream wind turbines is controlled based on measurements performed by at least one wind turbine which is a downstream wind turbine relative to the upstream wind turbine.

Normally, it is expected that variations in the incoming wind, for instance turbulence or gusts, reaches an upstream wind turbine before it reaches a downstream wind turbine, i.e. a wind turbine arranged behind the upstream wind turbine as seen in the direction of the incoming wind. In this case it may be advantageous to control the downstream wind turbine based on measurements performed by the upstream wind turbine, because thereby it is possible to take variations in the wind, which has already been detected at the upstream wind turbine, into account when controlling the downstream wind turbine, before these variations reach the downstream wind turbine.

However, when turbulence generating structures are arranged at the site of the wind farm, the additional turbulence which is generated by these structures may have the effect that variations in the incoming wind reaches the downstream wind turbine before reaching the upstream wind turbine. Therefore it is advantageous to control the upstream wind turbine based on measurements performed by the downstream wind turbine. Furthermore, it must be expected that the upstream wind turbines, in particular the turbines arranged at the boundary of the wind farm, are most vulnerable to variations in the incoming wind, for instance in the form of gusts, since they are not arranged in the wake of the other wind turbines. For instance, upstream wind turbines may be prone to tower strikes, i.e. collisions between wind turbine blades and wind turbine towers, in the case of gusty wind conditions. Thus, it is desirable to control these wind turbines in a manner which takes as much information about the incoming wind as possible into account, in order to protect these wind turbines to the highest possible extent, without having to derate them unnecessarily.

The step of controlling at least one of the upstream wind turbines may comprise derating the upstream wind turbine in the case that a wind speed measured by means of the at least one downstream wind turbine exceeds a predefined first threshold value. According to this embodiment, the measurements performed at the at least one downstream wind turbine include wind speed measurements, which could, e.g., be performed by means of anemometers mounted on the downstream wind turbines.

In the case that the wind speed measured by the at least one downstream wind turbine exceeds a predefined first threshold value, this is an indication that the upstream wind turbine may be subjected to high loads due to the incoming wind. Accordingly, when this occurs, the upstream wind turbine may be derated, i.e. it may be operated with a decreased output power. This decreases the loads on the upstream wind turbine, and thereby protects it from excessive load impacts, while maintaining some power production from the upstream wind turbine. The first threshold value could, e.g., be within the range of 15 m/s to 25 m/s, such as within the range of 17 m/s to 22 m/s, such as approximately 20 m/s.

As an alternative, the upstream wind turbine may be derated if the wind speed measured by at least one downstream wind turbine exceeds the wind speed measured by means of the upstream wind turbine by a certain wind speed difference, e.g. a wind speed difference within the range of 5 m/s to 15 m/s, such as within the range of 7 m/s to 12 m/s, such as approximately 10 m/s.

Alternative or additionally, the step of controlling at least one of the upstream wind turbines may comprise stopping the upstream wind turbine in the case that a wind speed measured by means of the at least one downstream wind turbine exceeds a predefined second threshold value.

The second threshold value may be higher than the first threshold value. In this case the upstream wind turbine is derated if the wind speed measured by the downstream wind turbine exceeds the first threshold value, and is stopped if the wind speed continues increasing to a level above the second, higher, threshold value. Stopping the upstream wind turbine provides further protection of the upstream wind turbine, but this comes at the cost that no power is produced by the upstream wind turbine. The second threshold value could, e.g., be within the range of 23 m/s to 33 m/s, such as within the range of 25 m/s to 30 m/s, such as approximately 28 m/s.

As an alternative, the upstream wind turbine may be stopped if the wind speed measured by at least one downstream wind turbine exceeds a certain threshold value exceeds the wind speed measured by means of the upstream wind turbine by a certain wind speed difference, e.g. a wind speed difference within the range of 10 m/s to 20 m/s, such as within the range of 12 m/s to 17 m/s, such as approximately 15 m/s.

For all of the scenarios described above it may be a requirement that the relevant threshold value has been exceeded for a predefined period of time before the upstream wind turbine is derated or stopped, in order to avoid derating or stopping the upstream wind turbine if the threshold value is only exceeded very briefly.

The step of detecting that turbulent wind conditions are occurring may be performed on the basis of wind speed measurements performed by at least two of the wind turbines of the wind farm. If turbulent wind conditions are occurring, it may be expected that the wind speed varies across the site of the wind farm. Accordingly, by measuring the wind speed by at least two of the wind turbines of the wind farm, and thereby at at least two different positions within the site of the wind farm, it can be derived whether or not turbulent wind conditions are occurring.

Thus, the step of detecting that turbulent wind conditions are occurring may comprise the steps of:

measuring wind speed by means of an upstream wind turbine and by means of a downstream wind turbine, and determining that turbulent wind conditions are occurring if the wind speed measured by means of the downstream wind turbine exceeds the wind speed measured by means of the upstream wind turbine by a predefined wind speed difference.

According to this embodiment, the wind speed is measured by means of an upstream wind turbine and by means of a downstream wind turbine, i.e. by at least two wind turbines where one of the wind turbines is arranged in front of the other wind turbine, as seen in the direction of the incoming wind. The two wind speed measurements are compared, and if it is revealed that the wind speed measured by means of the downstream wind turbine exceeds the wind speed measured by means of the upstream wind turbine by a predefined wind speed difference, it is determined that turbulent wind conditions are occurring.

As described above, when turbulent wind conditions are occurring, it may be expected that the wind speed varies across the site of the wind farm. Furthermore, the turbulence may lead to wind speeds measured at downstream positions being higher than wind speed measured at upstream positions. Thus, when the difference between the wind speeds measured at two positions of the site of the wind farm exceeds a predefined threshold value, and the wind speed measured at the downstream position is higher than the wind speed measured at the upstream position, this is a good indication that turbulent wind conditions are occurring.

At least one turbulence generating structure may form part of a terrain of the site of the wind farm. In this case the turbulence is generated as a result of properties of the terrain at the site. The turbulence generating structure could, in this case, be a hill, a valley and/or any other suitable kind of terrain which will give rise to turbulence.

In the case that the turbulence generating structure is a hill, at least one of the upstream wind turbines may be positioned on top of the hill, and at least one of the downstream wind turbines may be positioned downhill relative to the upstream wind turbine. In this case, turbulence is generated in front of the hill, as seen in the direction of the incoming wind. This has the consequence that a part of the incoming wind which is not caught in front of the hill reaches the downstream wind turbine before the turbulent wind which is caught in front of the hill reaches the upstream wind turbine. Accordingly, if variations in the incoming wind, such as gusts, occur, this will be detected by the downstream wind turbine before the variations in the wind reach the upstream wind turbine, positioned on top of the hill. Thus, by controlling the upstream wind turbine based on measurements performed by the downstream wind turbine, the upstream wind turbine can be controlled in a manner which takes the expected variations in the incoming wind into account, and appropriate measures, such as derating the upstream wind turbine, can be taken before the variations in the incoming wind reach the upstream wind turbine.

Similarly, in the case that the turbulence generating structure is a valley, at least one of the upstream wind turbines may be positioned immediately behind the valley, as seen in the wind direction. In this case, part of the wind stream is caught in the valley in front of the upstream wind turbine, and part of the wind stream passes above the valley as well as the upstream wind turbine, but reaches the downstream wind turbine. As described above, variations in the wind are thereby detected by the downstream wind turbine before they reach the upstream wind turbine, and it is therefore appropriate to control the upstream wind turbine on the basis of measurements performed by the downstream wind turbine.

Alternatively or additionally, at least one turbulence generating structure may be or form part of an object positioned at the site of the wind farm. Such objects could, e.g., be manmade structures, such as buildings, fences, etc. As an alternative, they could form part of the vegetation at the site of the wind farm, for instance trees, shrubbery, etc.

The step of controlling at least one of the upstream wind turbines based on measurement performed by at least one wind turbine which is a downstream wind turbine relative to the upstream wind turbine may be performed only if the detected wind direction is within a predefined wind direction range.

In some regions specific wind conditions are known to occur under certain circumstances. Such specific wind conditions are often related to a specific wind direction. An example of such specific wind conditions is the Bora which is a northern to north-eastern katabatic wind in the Adriatic Sea. Since such specific wind conditions may give rise to undesired variations in the wind pattern, which may require protection of the upstream wind turbines in the manner described above, it may be desirable to initiate the protection measures provided by the method of the invention when it is detected that the wind direction is within a wind direction range known to be associated with the specific wind conditions. In the case of the Bora, this would be north to north-east. However, when the wind direction is within any other wind direction range, protection of upstream wind turbines may not be required, and it may therefore not be necessary to perform the steps of the method according to the invention.

Furthermore, at some wind farm sites, the positions of the wind turbines may be such that upstream wind turbines in need of protection only exist at certain wind directions. In this case it may also only be relevant to perform the steps of the method according to the invention when the wind direction is within a corresponding wind direction range.

As an alternative, the steps of the method according to the invention may be performed regardless of the wind direction.

The step of detecting a wind direction may be performed on the basis of measurements performed by the wind turbines of the wind farm. Thereby it is ensured that the detected wind direction is indeed the wind direction prevailing at the site of the wind farm. Alternatively or additionally, the wind direction may be detected by means of equipment positioned outside, but in the vicinity of, the wind farm, based on satellite data and/or based on measurements performed by equipment, such as metmasts, positioned at the site of the wind farm.

The method may further comprise the steps of:
detecting that turbulent wind conditions are no longer occurring, and
stop controlling the at least one upstream wind turbine based on measurements performed by the at least one downstream wind turbine.

According to this embodiment, the upstream wind turbine is only controlled based on measurements performed by the at least one downstream wind turbine as long as the turbulent wind conditions are prevailing, and the upstream wind turbine is therefore in need of protection.

BRIEF DESCRIPTION OF THE DRAWINGS

The invention will now be described in further detail with reference to the accompanying drawings in which.

DETAILED DESCRIPTION OF THE DRAWINGS

Figure 1:
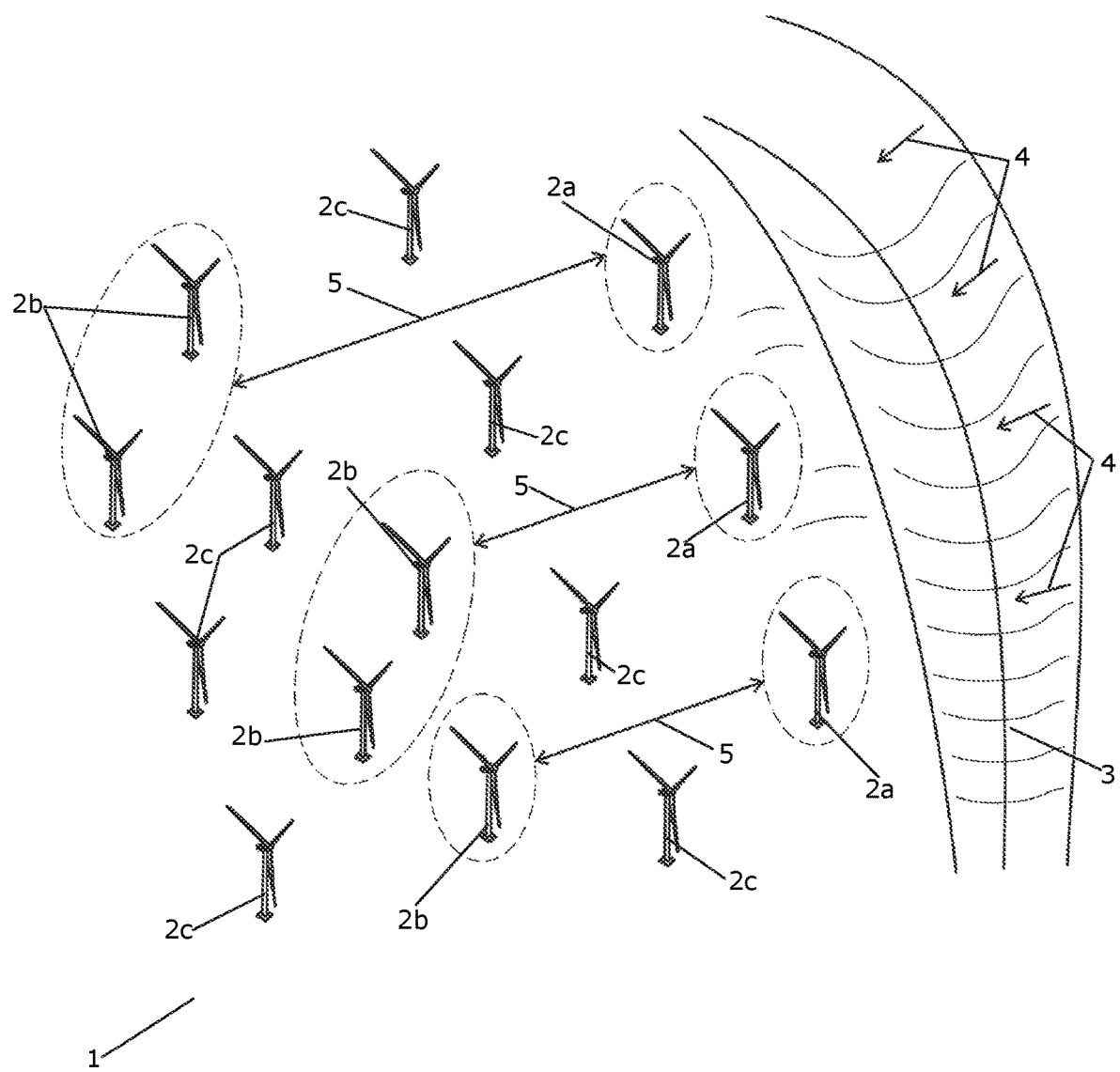
FIG. 1 is a top view of a wind farm comprising wind turbines being controlled in accordance with a method according to a first embodiment of the invention.

FIG. 1 is a top view of a wind farm 1 comprising a plurality of wind turbines 2. The wind farm 1 is positioned at a site where the terrain defines a turbulence generating structure in the form of a hill 3. The current wind direction is illustrated by arrows 4.

Three of the wind turbines 2a are positioned along a boundary of the wind farm 1 which faces the incoming wind 4. Thus, these wind turbines 2a arranged upstream with respect, i.e. in front of, the other wind turbines 2b, 2c of the wind farm 1, as seen in the direction of the incoming wind 4. Thus, these wind turbines 2a will in the following be referred to as 'upstream wind turbines' 2a.

Five of the wind turbines 2b are positioned in such a manner that they are directly behind one of the upstream wind turbines 2a, as seen in the direction of the incoming wind 4. Thus, these wind turbines 2b are each arranged downstream relative to one of the upstream wind turbines 2a, as seen in the direction of the incoming wind 4. Accordingly, these wind turbines 2b will in the following be referred to as 'downstream wind turbines' 2b. Arrows 5 indicate how the upstream wind turbines 2a and the downstream wind turbines 2b are related to each other.

The remaining wind turbines 2c of the wind farm 1 are positioned in such a manner that they are neither directly in front of, nor directly behind any of the other wind turbines 2, and they are therefore not used when performing the method according to the invention which will be described further below.

The upstream wind turbines 2a are all positioned in the vicinity of and behind the hill 3, as seen in the direction of the incoming wind 4. Accordingly, the upstream wind turbines 2a are all affected by the turbulence generated by the hill 3. Accordingly, when it is determined that the wind direction 4 is as shown in FIG. 1, the upstream wind turbines 2a may be in need of protection against adverse effects, e.g. caused by variations in the wind pattern.

Thus, when the wind direction 4 has been detected and it has been determined which of the wind turbines 2 should be denoted upstream wind turbines 2a and which should be denoted downstream wind turbines 2b, relevant measurements are performed by the wind turbines 2 of the wind farm 1. These measurements could, e.g., include wind speed, wind direction, temperature, etc.

Based on the measurements performed by the wind turbines 2, it may be detected that turbulent wind conditions are occurring. For instance, if a wind speed measured by one or more downstream wind turbines 2b exceeds a wind speed measured by means of a corresponding upstream wind turbine by a predefined wind speed difference, this may be an indication that turbulent wind conditions are occurring at the site of the wind farm 1, and that there may therefore be a need to protect the upstream wind turbines 2a.

In order to protect the upstream wind turbines 2a, each of the upstream wind turbines 2a is controlled based on measurements performed by at least one of the downstream wind turbines 2b related thereto. This will be described in further detail below with reference to FIG. 2.

Figure 2:
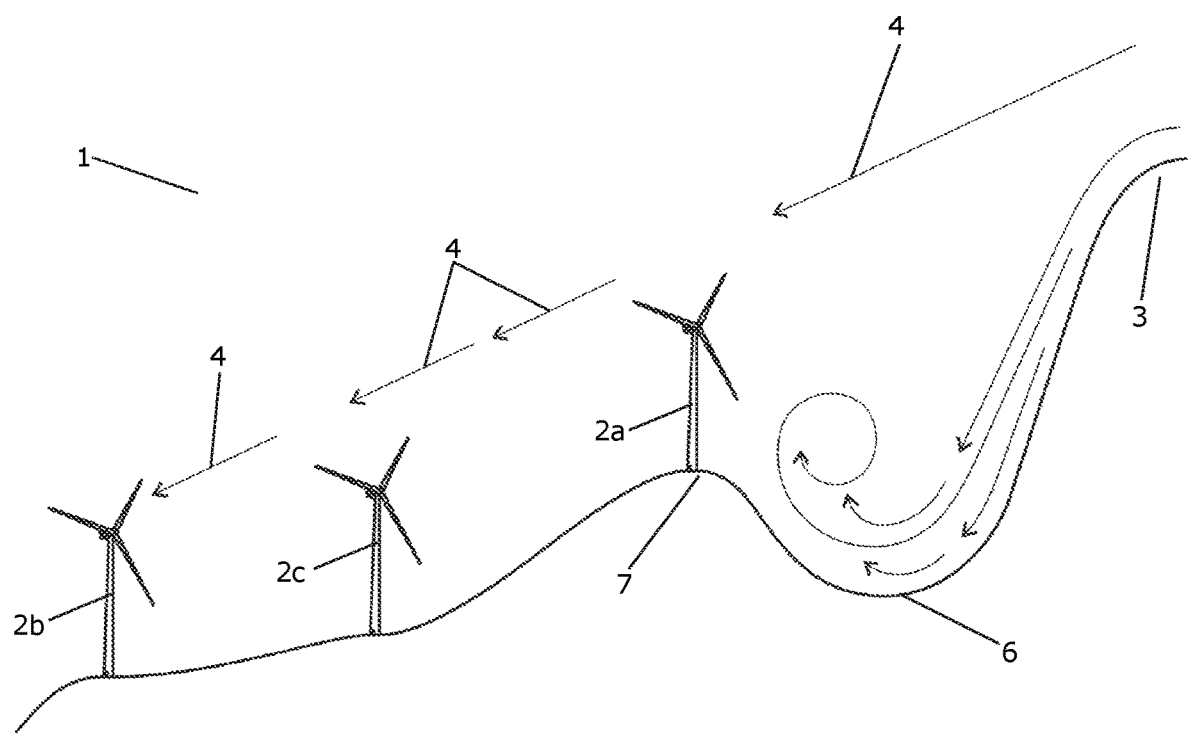
FIG. 2 is a side view of the wind farm of FIG. 1.

FIG. 2 is a side view of the wind farm 1 of FIG. 1, showing one upstream wind turbine 2a, one downstream wind turbine 2b and one wind turbine 2c which is neither designated as an upstream wind turbine nor as a downstream wind turbine. It can be seen that the upstream wind turbine 2a is positioned in the vicinity of the hill 3 and immediately adjacent to a valley 6 positioned between the hill 3 and a smaller hill 7 on which the upstream wind turbine 2a is positioned. It can be seen that the terrain including the hills 3, 7 and the valley 6 generates turbulence in the region immediately in front of the upstream wind turbine 2a, as seen in the direction of the incoming wind 4.

The downstream wind turbine 2b is arranged further downhill than the upstream wind turbine 2a. This has the consequence that the part of the airstream which does not become turbulent due to the terrain passes above the upstream wind turbine 2a, but reaches the downstream wind turbine 2b. The results is that any variations in the wind pattern of the incoming wind stream, e.g. in the form of gusts, turbulence or a fast increase in wind speed, reaches the downstream wind turbine 2b before it reaches the upstream wind turbine 2a, despite the fact that the upstream wind turbine 2a is arranged in front of the downstream wind turbine 2b, as seen in the wind direction 4. Therefore, by controlling the upstream wind turbine 2a based on measurements performed by the downstream wind turbine 2b, it is possible to take account of such variations in the wind pattern while controlling the upstream wind turbine 2a, before the variations reach the upstream wind turbine 2a. Thereby the upstream wind turbine 2a is protected.

Figure 3:
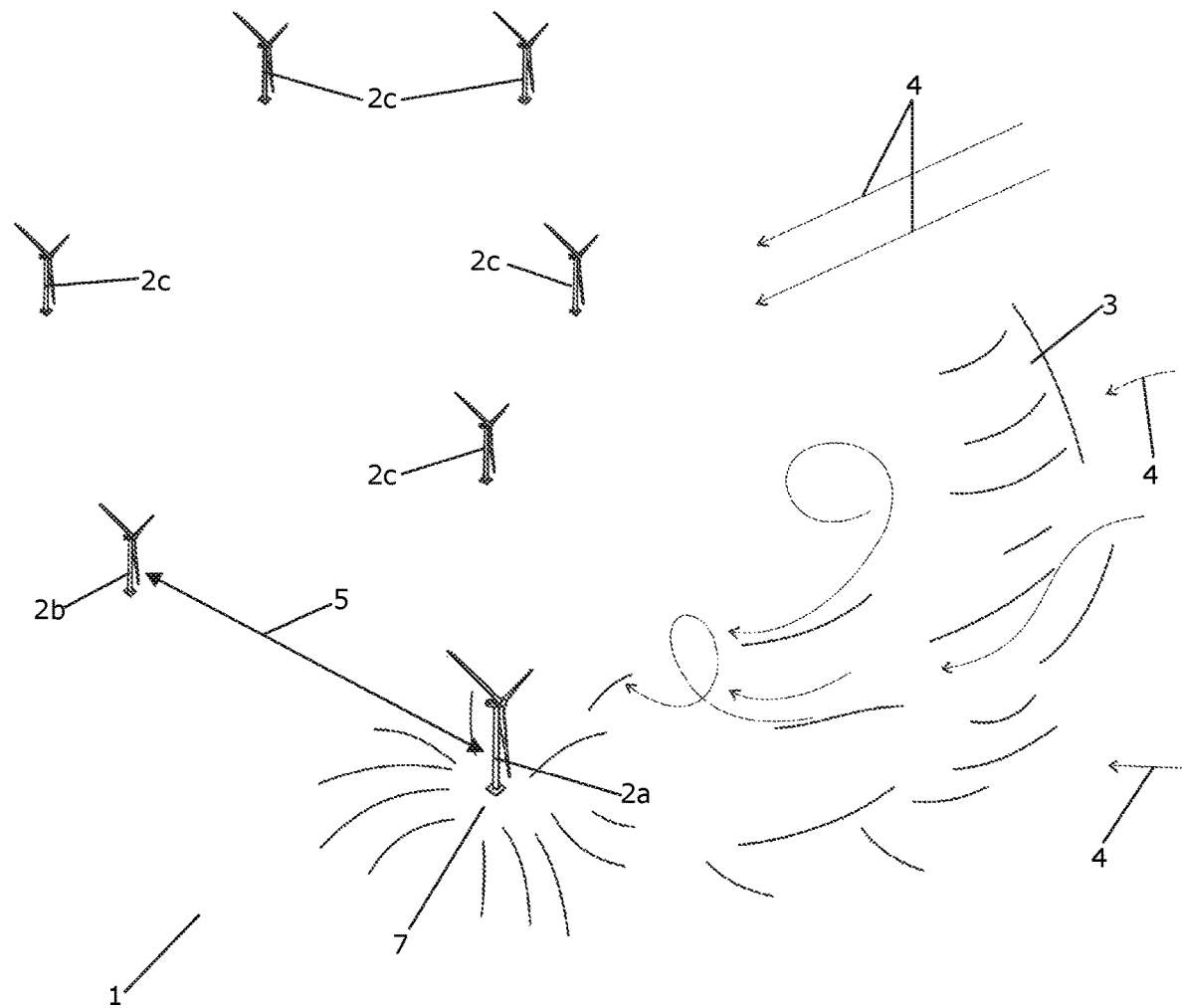
FIG. 3 illustrates a wind farm comprising wind turbines being controlled in accordance with a method according to a second embodiment of the invention.

FIG. 3 also illustrates a wind farm 1 comprising a plurality of wind turbines 2. The terrain at the site of the wind farm 1 of FIG. 3 differs from the site of the wind farm 1 of FIGS. 1 and 2 in that the turbulence generating hill 3 arranged near the boundary of the wind farm 1 has a smaller extent than the hill 3 illustrated in FIGS. 1 and 2.

An upstream wind turbine 2a is positioned on a smaller hill 7 and behind the higher, turbulence generating hill 3. Thereby the upstream wind turbine 2a is affected by the turbulence generated by the hill 3. A downstream wind turbine 2b is positioned in such a manner that it is not behind the hill 3, as seen in the direction of the incoming wind 4. Accordingly, the wind which reaches the downstream wind turbine 2b is unaffected by the hill 3. The downstream wind turbine 2b is furthermore not positioned directly behind the upstream wind turbine 2a as seen in the wind direction 4. However, it is still relevant to control the upstream wind turbine 2a based on measurements performed by the downstream wind turbine 2b, because variations in the wind pattern of the incoming wind 4 will reach the downstream wind turbine 2b before reaching the upstream wind turbine 2a, because the unaffected part of the wind stream reaches the downstream wind turbine 2b, whereas the part of the wind stream which has been affected by the terrain reaches the upstream wind turbine 2a. This is similar to the situation illustrated in FIGS. 1 and 2.

Figure 4:
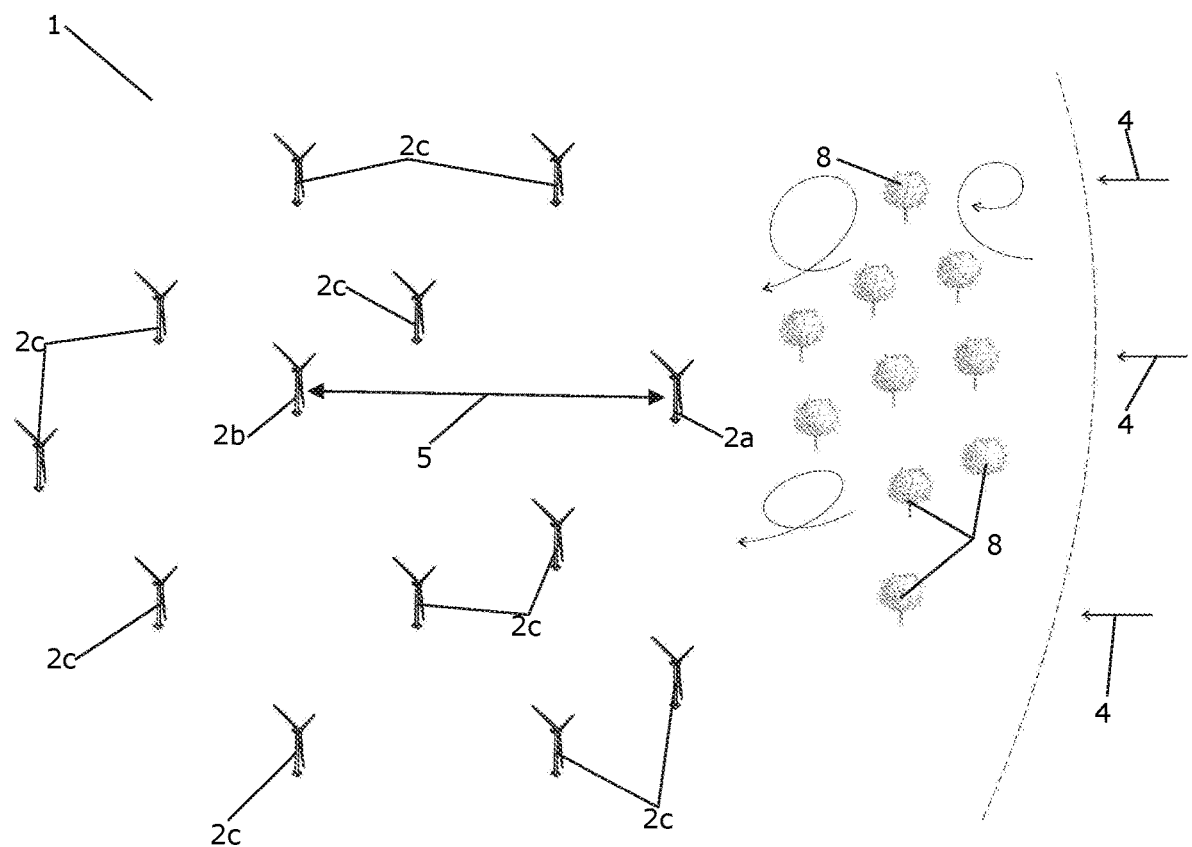
FIG. 4 illustrates a wind farm comprising wind turbines being controlled in accordance with a method according to a third embodiment of the invention.

FIG. 4 also illustrates a wind farm 1 comprising a plurality of wind turbines 2. One upstream wind turbine 2a, one downstream wind turbine 2b and ten wind turbines 2c which are neither designated as upstream wind turbines nor as downstream wind turbines are shown. At the site of the wind farm 1 of FIG. 4 there are no hills or valleys. Instead a number of turbulence generating structures in the form of a plurality of trees 8 are positioned within the site.

The upstream wind turbine 2a is positioned immediately behind the trees 8, as seen in the direction of the incoming wind 4, and the upstream wind turbine 2a is therefore affected by the turbulence generated by the trees 8.

The downstream wind turbine 2b is positioned directly behind the upstream wind turbine 2a, as seen in the wind direction 4. However, the distance between the upstream wind turbine 2a and the downstream wind turbine 2b is so long that the downstream wind turbine 2b is not affected by the turbulence generated by the trees 8. Similarly to the situation described above with reference to FIGS. 1 and 2, variations in the wind pattern of the incoming wind 4 will thereby reach the downstream wind turbine 2b before reaching the upstream wind turbine 2a. Accordingly, it is relevant to control the upstream wind turbine 2a based on measurements performed by the downstream wind turbine 2b.

Figure 5:
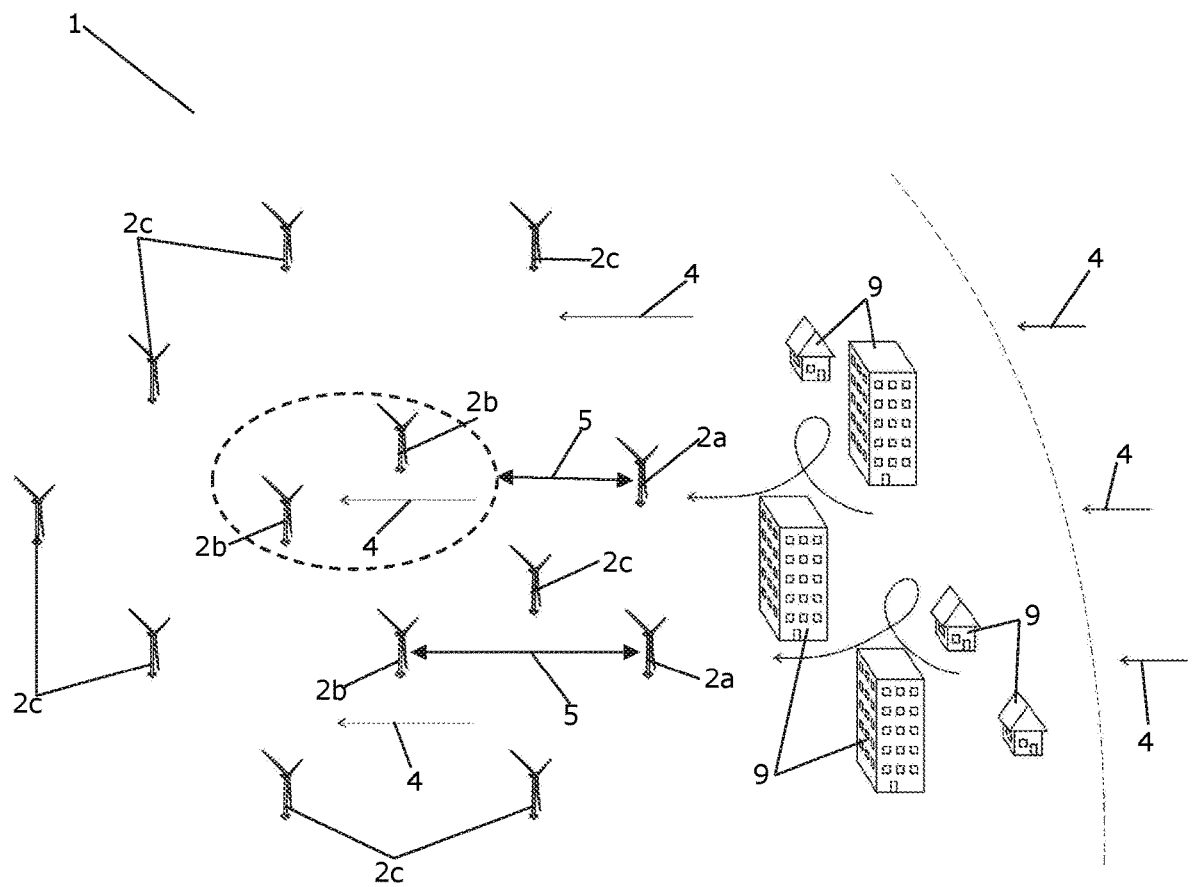
FIG. 5 illustrates a wind farm comprising wind turbines being controlled in accordance with a method according to a fourth embodiment of the invention.

FIG. 5 also illustrates a wind farm 1 comprising a plurality of wind turbines 2. Two upstream wind turbines 2a, four downstream wind turbines 2b and eight wind turbines 2c which are neither designated as upstream wind turbines nor as downstream wind turbines are shown. At the site of the wind farm 1 of FIG. 5 there are neither hills and valleys, nor trees. Instead a number of manmade turbulence generating structure in the form of buildings 9 are positioned within the site.

The upstream wind turbines 2a are positioned immediately behind the buildings 9, as seen in the direction of the incoming wind 4, and the upstream wind turbines 2a are therefore affected by the turbulence generated by the buildings 9.

Similarly to the situation described above with reference to FIG. 4, the downstream wind turbines 2b are positioned behind the upstream wind turbines 2a, at a distance which is sufficient to ensure that the downstream wind turbines 2b are not affected by the turbulence generated by the buildings 9. Thereby, variations in the wind pattern of the incoming wind 4 will reach the downstream wind turbines 2b before reaching the upstream wind turbines 2a, and it is therefore relevant to control the upstream wind turbines 2a based on measurements performed by the downstream wind turbines 2b.

Figure 6:
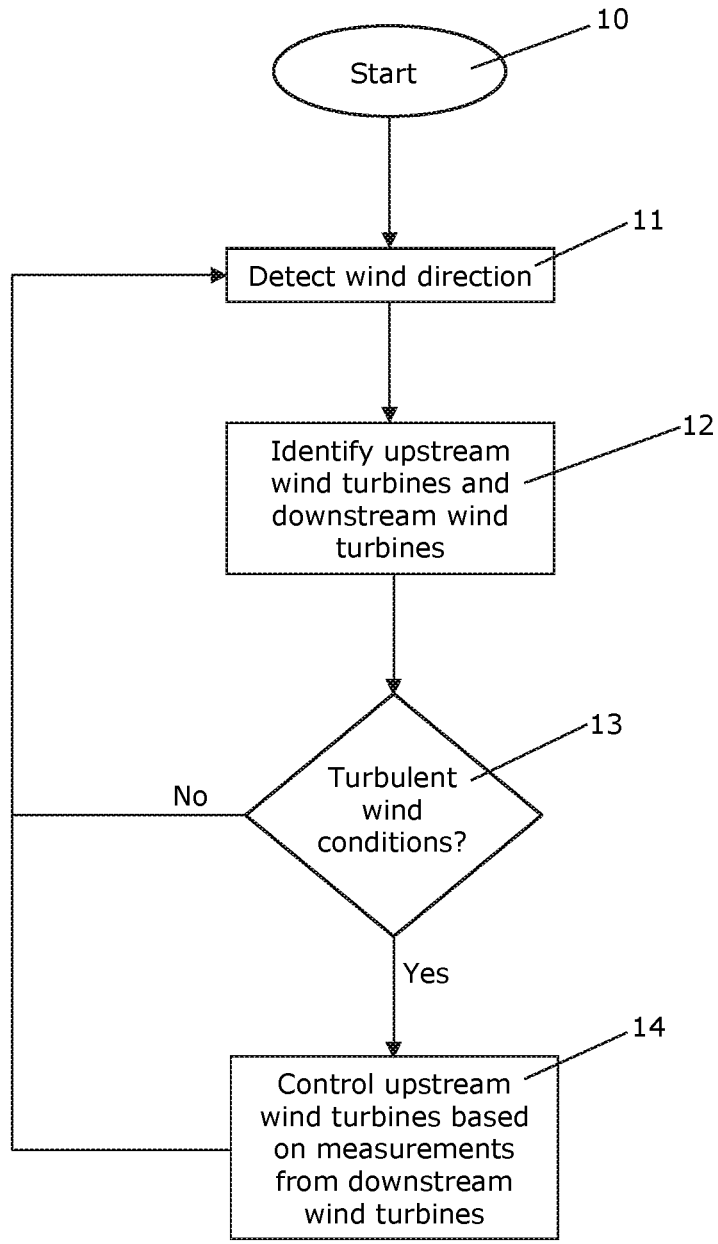
FIG. 6 is a flow diagram illustrating a method for controlling wind turbines of a wind farm according to an embodiment of the invention.

FIG. 6 is a flow diagram illustrating a method for controlling wind turbines of a wind farm according to an embodiment of the invention.

The process is started at step 10. At step 11 a wind direction prevailing at the site of the wind farm is detected. This could, e.g., be done based on measurements performed by one or more of the wind turbines of the wind farm and/or based on measurements performed by separate equipment, e.g. mounted on a metmast, positioned either within the site of the wind farm or outside, but in the vicinity of, the site of the wind farm. Alternatively or additionally, the wind direction may be detected based on satellite data.

At step 12 one or more upstream wind turbines and one or more downstream wind turbines are identified, based on the detected wind direction. The upstream wind turbines are wind turbines which are positioned in front of one or more of the other wind turbines of the wind farm, as seen in the wind direction. Similarly, the downstream wind turbines are wind turbines which are positioned behind one or more of the other wind turbines of the wind farm, as seen in the wind direction. Furthermore, relationships between the upstream wind turbines and the downstream wind turbines may be defined, i.e. it may be determined which of the downstream wind turbines are 'downstream' with respect to a given upstream wind turbine, etc.

At step 13 it is investigated whether or not turbulent wind conditions are occurring at the site of the wind farm. This is done on the basis of measurements performed by the wind turbines of the wind farm, e.g. wind speed measurements performed by the individual wind turbines of the wind farm. Accordingly, the investigation regarding whether or not turbulent wind conditions are occurring at the site of the wind farm is performed on the basis of measurements performed at various positions within the site of the wind farm, i.e. it is based on actual measured values obtained on site, and thereby accurately reflect the conditions at the site.

For instance, the step of investigating whether or not turbulent wind conditions are occurring at the site of the wind farm may, e.g., include measuring wind speed by means of at least one upstream wind turbine and by means of at least one downstream wind turbine, and comparing these measured wind speeds. In the case that the wind speed measured by means of the downstream wind turbine exceeds the wind speed measured by means of the upstream wind turbine by a predefined wind speed difference, this is an indication that turbulence is occurring at the site of the wind farm. On the other hand, as long as the wind speed measured by means of the upstream wind turbine exceeds the wind speed measured by means of the downstream wind turbine, or the wind speed difference between the two measured wind speeds is smaller than the predefined wind speed difference, this is an indication that turbulence is not occurring at the site of the wind farm. Accordingly, the measured wind speeds provide an appropriate basis for determining whether or not turbulent wind conditions are occurring at the site of the wind farm.

In the case that step 13 reveals that turbulent wind conditions are not occurring at the site of the wind farm, the wind turbines of the wind farm are controlled in a normal manner, i.e. each wind turbine is controlled on the basis of measurements performed by the wind turbine itself. Furthermore, the process is returned to step 11 for continued monitoring of the wind direction.

In the case that step 13 reveals that turbulent wind conditions are occurring at the site of the wind farm, the process is forwarded to step 14. At step 14 the upstream wind turbine is controlled on the basis of measurements performed by at least one wind turbine which is a downstream wind turbine relative thereto.

Furthermore, the process is returned to step 11 for continued monitoring of the wind direction.

The invention claimed is:

1. A method for controlling wind turbines of a wind farm comprising a plurality of wind turbines, the wind farm being positioned at a site which includes one or more turbulence generating structures, the method comprising:
   detecting a wind direction at the site of the wind farm;
   identifying one or more upstream wind turbines and one or more downstream wind turbines, based on the detected wind direction, where each of the upstream wind turbines is arranged in front of one or more of the downstream wind turbines, as seen in the wind direction;
   detecting that turbulent wind conditions are occurring, based on measurements performed by the wind turbines of the wind farm, and wherein detecting that turbulent wind conditions are occurring comprises:
      measuring wind speed by one of the one or more upstream wind turbines and by one of the one or more downstream wind turbines; and
      determining that turbulent wind conditions are occurring if the wind speed measured by the one of the one or more downstream wind turbines exceeds the wind speed measured by the one of the one or more upstream wind turbines by a predefined wind speed difference; and controlling at least one of the upstream wind turbines based on measurements performed by at least one wind turbine which is a downstream wind turbine relative to the upstream wind turbine.

2. The method of claim 1, wherein controlling at least one of the upstream wind turbines comprises derating the upstream wind turbine in the case that a wind speed measured by the at least one downstream wind turbine exceeds a predefined first threshold value.

3. The method of claim 1, wherein controlling at least one of the upstream wind turbines comprises stopping the upstream wind turbine in the case that a wind speed measured by the at least one downstream wind turbine exceeds a predefined second threshold value.

4. The method of claim 1, wherein detecting that turbulent wind conditions are occurring is performed on the basis of wind speed measurements performed by at least two of the wind turbines of the wind farm.

5. The method of claim 1, wherein at least one turbulence generating structure forms part of a terrain of the site of the wind farm.

6. The method of claim 1, wherein at least one turbulence generating structure is or forms part of an object positioned at the site of the wind farm.

7. The method of claim 1, wherein controlling the at least one of the upstream wind turbines based on measurements performed by the at least one wind turbine which is the downstream wind turbine relative to the upstream wind turbine is performed only if the detected wind direction is within a predefined wind direction range.

8. The method of claim 1, wherein detecting a wind direction is performed on the basis of measurements performed by the wind turbines of the wind farm.

9. The method of claim 1, further comprising:
detecting that turbulent wind conditions are no longer occurring; and
stop controlling the at least one upstream wind turbine based on measurements performed by the at least one downstream wind turbine.

10. The method of claim 1, wherein controlling the at least one of the upstream wind turbines comprises:
derating the upstream wind turbine in the case that a wind speed measured by the at least one downstream wind turbine exceeds a predefined first threshold value; and
stopping the upstream wind turbine in the case that a wind speed measured by the at least one downstream wind turbine exceeds a predefined second threshold value.

11. A method for controlling wind turbines of a wind farm comprising a plurality of wind turbines, the wind farm being positioned at a site which includes one or more turbulence generating structures, the method comprising:
detecting a wind direction at the site of the wind farm;
identifying one or more upstream wind turbines and one or more downstream wind turbines, based on the detected wind direction, where each of the upstream wind turbines is arranged in front of one or more of the downstream wind turbines, as seen in the wind direction;
detecting that turbulent wind conditions are occurring, based on measurements performed by the wind turbines of the wind farm;
in response to determining that the turbulent wind conditions are occurring, switching a first control scheme to a second control scheme, wherein implementing the first control scheme comprises controlling at least one of the one or more downstream wind turbines based on measurements performed by at least one of the one or more upstream wind turbines, and wherein implementing the second control scheme comprises:
controlling at least one of the upstream wind turbines based on measurements performed by at least one wind turbine which is a downstream wind turbine relative to the upstream wind turbine, wherein controlling at least one of the upstream wind turbines comprises:
derating the upstream wind turbine in the case that a wind speed measured by the at least one downstream wind turbine exceeds a predefined first threshold value; and
stopping the upstream wind turbine in the case that a wind speed measured by the at least one downstream wind turbine exceeds a predefined second threshold value.

12. The method of claim 11, wherein detecting that turbulent wind conditions are occurring is performed on the basis of wind speed measurements performed by at least two of the wind turbines of the wind farm.

13. The method of claim 12, wherein detecting that turbulent wind conditions are occurring comprises:
measuring wind speed by one of the one or more upstream wind turbines and by one of the one or more downstream wind turbines; and
determining that turbulent wind conditions are occurring if the wind speed measured by the one of the one or more downstream wind turbines exceeds the wind speed measured by the one of the one or more upstream wind turbines by a predefined wind speed difference.

14. The method of claim 11, wherein at least one turbulence generating structure forms part of a terrain of the site of the wind farm.

15. The method of claim 11, at least one turbulence generating structure is or forms part of an object positioned at the site of the wind farm.

16. The method of claim 11, wherein controlling the at least one of the upstream wind turbines based on measurements performed by the at least one wind turbine which is the downstream wind turbine relative to the upstream wind turbine is performed only if the detected wind direction is within a predefined wind direction range.

17. The method of claim 11, wherein detecting a wind direction is performed on the basis of measurements performed by the wind turbines of the wind farm.

18. The method of claim 11, further comprising:
detecting that turbulent wind conditions are no longer occurring; and
stop controlling the at least one upstream wind turbine based on measurements performed by the at least one downstream wind turbine.

19. A method for controlling wind turbines of a wind farm comprising a plurality of wind turbines, the wind farm being positioned at a site which includes one or more turbulence generating structures, the method comprising:
detecting a wind direction at the site of the wind farm;
identifying one or more upstream wind turbines and one or more downstream wind turbines, based on the detected wind direction, where each of the upstream wind turbines is arranged in front of one or more of the downstream wind turbines, as seen in the wind direction;

detecting that turbulent wind conditions are occurring, based on measurements performed by the wind turbines of the wind farm; and in response to the one or more turbulence generating structures generating additional turbulence so as to have an effect that variations in incoming wind reach one of the one or more downstream wind turbines before reaching one of the one or more upstream wind turbines, as seen in a direction of the incoming wind, controlling at least one of the upstream wind turbines based on measurements performed by at least one wind turbine which is a downstream wind turbine relative to the upstream wind turbine.

\* \* \* \* \*